United States Patent
Munnelly et al.

(10) Patent No.: US 12,492,325 B2
(45) Date of Patent: Dec. 9, 2025

(54) THIN FILM ADHESIVE LABELS AND METHODS OF MAKING THEREOF

(71) Applicant: ACTEGA North America Technologies, Inc., Cinnaminson, NJ (US)

(72) Inventors: Heidi M. Munnelly, Cumberland, RI (US); Nikolai A. Voicechovski, Westerly, RI (US); Benjamin Lux, Providence, RI (US)

(73) Assignee: ACTEGA North America Technologies, Inc., Cinnaminson, NJ (US)

( * ) Notice: Subject to any disclaimer, the term of this patent is extended or adjusted under 35 U.S.C. 154(b) by 0 days.

(21) Appl. No.: 17/838,803

(22) Filed: Jun. 13, 2022

(65) Prior Publication Data

US 2022/0306903 A1    Sep. 29, 2022

Related U.S. Application Data

(63) Continuation of application No. 16/190,863, filed on Nov. 14, 2018, now abandoned.
(Continued)

(51) Int. Cl.
*C09J 7/29* (2018.01)
*B32B 7/06* (2019.01)
(Continued)

(52) U.S. Cl.
CPC ................ *C09J 7/29* (2018.01); *B32B 7/06* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS 3,276,933 A    10/1966 Brant
3,289,386 A    12/1966 Farmer
(Continued)

FOREIGN PATENT DOCUMENTS

DE    3508150    12/1985
DE    29902548    6/1999
(Continued)

OTHER PUBLICATIONS

Breard, "Hanging on through thick and thin: A look at static-cling vinyls", Screenprinting Magazine:Mar. 1-9, 2005.
(Continued)

*Primary Examiner* — Kelly M Gambetta
(74) *Attorney, Agent, or Firm* — Pabst Patent Group LLP

(57) ABSTRACT

Thin film labels, systems, and methods of making and using thereof are described. The thin film systems contain a label and a carrier film, where the label contains an overprint layer, indicia, and an adhesive layer. The carrier film may be coated on one or both sides with a release liner. The adhesive layer can be any suitable adhesive, such as a pressure sensitive adhesive, a fluid activatable adhesive, a heat activated adhesive, or a contact activated adhesive. The label is formed by printed or coating one or more layers of precursor material on the carrier film using standard printers. Suitable precursor materials include, but are not limited to epoxys, solvent cast films, polyurethane dispersions, such as acrylic-urethane hybrid polymer dispersions and polyester-polyurethane dispersions. After the overprint layer dries or is cured, the indicia are printed onto the overprint layer, then the adhesive is coated on top of the indicia.

7 Claims, 6 Drawing Sheets

Related U.S. Application Data

(60) Provisional application No. 62/588,027, filed on Nov. 17, 2017.

(51) Int. Cl.
    *B32B 7/12*     (2006.01)
    *B32B 27/08*     (2006.01)
    *C09J 7/10*     (2018.01)
    *G09F 3/02*     (2006.01)
    *G09F 3/10*     (2006.01)

(52) U.S. Cl.
    CPC .................. *C09J 7/10* (2018.01); *G09F 3/02* (2013.01); *G09F 3/10* (2013.01); *B32B 2519/00* (2013.01); *C09J 2203/334* (2013.01); *C09J 2301/302* (2020.08); *C09J 2433/006* (2013.01); *C09J 2467/006* (2013.01); *G09F 2003/0241* (2013.01)

(56) References Cited

U.S. PATENT DOCUMENTS

| | | |
|---|---|---|
| 3,296,018 A | 1/1967 | Sullivan |
| 3,296,723 A | 1/1967 | Gobel |
| 3,351,515 A | 11/1967 | Muttera, Jr. |
| 3,531,316 A | 9/1970 | Sternasty |
| 3,989,609 A | 11/1976 | Brack |
| 4,008,115 A | 2/1977 | Fairbanks |
| 4,180,929 A | 1/1980 | Schultz, Jr. |
| 4,192,783 A | 3/1980 | Bomball |
| 4,219,596 A | 8/1980 | Yukihiko |
| 4,253,899 A | 3/1981 | Takemoto |
| 4,256,899 A | 3/1981 | Makisumi |
| 4,334,431 A | 6/1982 | Kohno |
| 4,575,525 A | 3/1986 | Wacome |
| 5,013,631 A | 5/1991 | Su |
| 5,089,336 A | 2/1992 | Kumar |
| 5,284,688 A | 2/1994 | Hiatt |
| 5,403,025 A | 4/1995 | Shanley |
| 5,417,790 A | 5/1995 | Petrou |
| 5,587,405 A | 12/1996 | Tanaka |
| 6,020,062 A | 2/2000 | Questel |
| 6,054,006 A | 4/2000 | Pilon |
| 6,062,062 A | 5/2000 | Toida |
| 6,124,417 A | 9/2000 | Su |
| 6,210,524 B1 | 4/2001 | Josephy |
| 6,210,795 B1 | 4/2001 | Nelson |
| 6,228,486 B1 | 5/2001 | Kittel |
| 6,236,063 B1 | 5/2001 | Yamazaki |
| 6,270,871 B1 | 8/2001 | Scholz |
| 6,298,894 B1 | 10/2001 | Nagamoto |
| 6,306,242 B1 | 10/2001 | Dronzek |
| 6,461,707 B1 | 10/2002 | Scholz |
| 6,517,664 B1 | 2/2003 | Dronzek, Jr. |
| 6,562,402 B2 | 5/2003 | Scholz |
| 6,656,319 B1 | 12/2003 | Boyd |
| 6,663,746 B2 | 12/2003 | Dronzek |
| 6,749,710 B2 | 6/2004 | Preston |
| 6,773,653 B2 | 8/2004 | Miller |
| 6,890,400 B2 | 5/2005 | Scholz |
| 6,942,912 B1 | 9/2005 | Blom |
| 7,026,024 B2 | 4/2006 | Chang |
| 7,122,597 B2 | 10/2006 | Calienni |
| 7,622,171 B2 | 11/2009 | Laprade |
| 7,643,401 B2 | 1/2010 | Takahashi |
| 7,892,598 B1 | 2/2011 | Dronzek |
| 7,943,714 B2 | 5/2011 | Schnieders |
| 8,334,335 B2 | 12/2012 | Lux |
| 8,334,336 B2 | 12/2012 | Lux |
| 8,349,427 B2 | 1/2013 | Grotefend |
| 8,458,932 B2 | 6/2013 | Schnuckle |
| 8,609,212 B2 | 12/2013 | White |
| 8,716,372 B2 | 5/2014 | Lux |
| 8,716,389 B2 | 5/2014 | Lux |
| 8,840,994 B2 | 9/2014 | Cho |
| 9,911,367 B2 | 3/2018 | Lux |
| 2002/0015828 A1 | 2/2002 | Ast |
| 2002/0121631 A1 | 9/2002 | Rahman |
| 2003/0034645 A1 | 2/2003 | Dronzek |
| 2003/0051382 A1 | 3/2003 | Sinato |
| 2003/0152722 A1 | 8/2003 | Fearn |
| 2003/0232168 A1 | 12/2003 | Fearn |
| 2004/0038028 A1 | 2/2004 | Tanaka |
| 2004/0221944 A1 | 11/2004 | Havard |
| 2005/0153113 A1 | 7/2005 | Hseih |
| 2005/0191486 A1 | 9/2005 | Scholz |
| 2005/0277358 A1 | 12/2005 | Isenberg |
| 2005/0284566 A1 | 12/2005 | Wagner |
| 2006/0084713 A1* | 4/2006 | Bach .............. C08G 18/6755 522/168 |
| 2007/0009732 A1 | 1/2007 | Tsai |
| 2007/0062086 A1 | 3/2007 | Hamel |
| 2007/0119542 A1 | 5/2007 | Williams |
| 2008/0060756 A1 | 3/2008 | Schnieders |
| 2008/0138550 A1 | 6/2008 | Takahashi |
| 2008/0145338 A1* | 6/2008 | Anderson ......... C08F 299/0485 528/367 |
| 2009/0072122 A1 | 3/2009 | Tada |
| 2009/0136773 A1 | 5/2009 | Ghosh |
| 2009/0169780 A1 | 7/2009 | Kimura |
| 2009/0288759 A1 | 11/2009 | Toepfer |
| 2011/0033698 A1 | 2/2011 | Woods |
| 2011/0189477 A1 | 8/2011 | Miracle |
| 2011/0289647 A1 | 12/2011 | Chiao |
| 2012/0067759 A1 | 3/2012 | Seung |
| 2012/0123014 A1* | 5/2012 | Chretien ............ G03G 15/2098 522/182 |
| 2013/0034726 A1 | 2/2013 | Lux |
| 2013/0309397 A1 | 11/2013 | Breton |
| 2014/0045976 A1 | 2/2014 | Lux |
| 2014/0190631 A1 | 7/2014 | Cho |
| 2014/0212615 A1 | 7/2014 | Norgaard |
| 2015/0266606 A1 | 9/2015 | Wiegers |
| 2015/0293558 A1 | 10/2015 | Hahn |
| 2015/0294602 A1 | 10/2015 | Read |
| 2015/0367977 A1 | 12/2015 | Cho |
| 2016/0335927 A1 | 11/2016 | Lux |
| 2016/0351082 A1 | 12/2016 | Barnhardt |
| 2016/0351083 A1* | 12/2016 | Barnhardt ............ B32B 27/38 |
| 2018/0082610 A1 | 3/2018 | Lux |

FOREIGN PATENT DOCUMENTS

| | | |
|---|---|---|
| DE | 29902549 | 6/1999 |
| DE | 19852008 | 5/2000 |
| DE | 19905468 | 7/2000 |
| DE | 19962582 | 7/2000 |
| EP | 0267619 | 5/1988 |
| EP | 0312037 | 4/1989 |
| EP | 0503112 | 9/1992 |
| EP | 0705896 | 4/1996 |
| EP | 1593521 | 11/2005 |
| GB | 841802 | 7/1960 |
| GB | 1333710 | 10/1973 |
| JP | 56173467 | 12/1981 |
| JP | 2954976 | 9/1999 |
| JP | 2001030452 | 2/2001 |
| JP | 200236797 | 2/2002 |
| JP | 2002036797 | 2/2002 |
| JP | 2002363515 | 12/2002 |
| JP | 2003171586 | 6/2003 |
| JP | 2003171587 | 6/2003 |
| WO | 1997034810 | 9/1997 |
| WO | 9919412 | 4/1999 |
| WO | 1999054860 | 10/1999 |
| WO | 2002014448 | 2/2002 |
| WO | 2002045054 | 6/2002 |
| WO | 2002055295 | 7/2002 |
| WO | 2006000424 | 1/2006 |
| WO | 2007077036 | 7/2007 |
| WO | 2009024357 | 2/2009 |
| WO | 2010026163 | 3/2010 |
| WO | 2010076807 | 7/2010 |
| WO | 2011115000 | 9/2011 |

(56) References Cited

FOREIGN PATENT DOCUMENTS

| WO | 2012109140 | 8/2012 |
| WO | 2012109148 | 8/2012 |
| WO | 2014109983 | 7/2014 |
| WO | 2014186678 | 11/2014 |
| WO | 2016183369 | 11/2016 |

OTHER PUBLICATIONS

International Search Report for corresponding PCT application PCT/US2018/061004 mailed Feb. 27, 2019.
Delamination Peel Testing for Barnhardt US20160351082A1 (2024).
Wolfe; Report 24-199 Rev 1: Carrier Delamination Testing (2024).
Rayoface C; Technical Data Sheet (2024).
Mitsubishi Chemical Group, 447CRL Clear Non-Silicone Release Liner (2024).
Inteplast Group, TT-Clear Non Heat Sealable (2024).
Dyna-Tech, JRX-1253 (2024).
ASTM International, "Standard Test Method for Peel Adhesion of Pressure-Senisitive Tape" (2023).
Communication of a notice of opposition from the European Patent Office mailed Oct. 17, 2024.

\* cited by examiner

THIN FILM ADHESIVE LABELS AND METHODS OF MAKING THEREOF

CROSS-REFERENCE TO RELATED APPLICATION

This application is a continuation of U.S. application Ser. No. 16/190,863 filed Nov. 14, 2018, which claims benefit of and priority to U.S. Application No. 62/588,027 filed on Nov. 17, 2017, the disclosures of which are incorporated herein in their entirety.

FIELD OF THE INVENTION

The invention is generally directed to thin film labels and methods of making thereof.

BACKGROUND OF THE INVENTION

Typical container decorations include the use of pressure-sensitive labels. A typical pressure-sensitive label includes a printed clear film, a pressure sensitive adhesive, and a release liner. The label (i.e., the film and indicia) typically adheres to a container with the pressure-sensitive adhesive. The release liner is discarded after labeling the containers.

An unprinted laminate construction is typically produced through a lamination process where a release liner is laminated to the unprinted clear film using a pressure sensitive adhesive.

Clear film pressure sensitive laminate constructions are popular as they provide container decorations with minimal aesthetic interruption caused by labeling media. This allows for a greater focus on the indicia and the contents of the container.

To reduce material consumption and cost of labeling, it is common to use thin films for both the liner and the label base stock. For example, typical liners are as thin as 0.96-1.2 mils (0.0244-0.0305 mm); and typical labels are 1.2 mils-3.5 mils (0.0305 mm-0.0889 mm) in thickness. The liner and label base are typically extruded plastics. Typically, there are additional coatings or treatments present on the label base to enhance printability as well as promote or allow adhesion of a pressure sensitive adhesive. Typically, a liner base material is coated, siliconized, or treated to allow adequate release of a pressure sensitive adhesive during label application. However, thinner films present challenges to the laminating, printing, and application process, as the thin films do not have good handling properties. In addition, extrusion processes utilized to make thin films also have diminishing handling properties and efficiencies as film thickness decreases.

Therefore there is a need for improved thin film labels and thin film labeling system, which can be more easily handled.

There is a further need for improved thin film labels and thin film labeling systems that do not rely on costly lamination processes.

There is also a need for an improved method for making thin films and thin film labeling systems.

SUMMARY OF THE INVENTION

Thin film labels, systems, and methods of making and using thereof are described. The thin film systems contain a label and a carrier film, where the label contains an overprint layer, indicia, and an adhesive layer. The carrier film may be coated or treated on one or both sides to promote adhesive layer and/or film release. The adhesive layer can be any suitable adhesive, such as a pressure sensitive adhesive, a fluid activatable adhesive, a heat activated adhesive, or a contact activated adhesive.

The films are so thin that they are difficult to handle. Therefore, they are formed by printing or coating the precursor materials on a support substrate, typically a carrier film.

The label is formed by printing or coating one or more layers of precursor material directly on the carrier film using standard printing techniques. Suitable precursor materials include, but are not limited to epoxies, solvent cast films, UV-curable precursor compositions, polyurethane dispersions, such as acrylic-urethane hybrid polymer dispersions and polyester-polyurethane dispersions. After the overprint layer dries or is cured, the indicia are printed onto the overprint layer, then the adhesive is coated or applied by a printing press on top of the indicia. The adhesive may be formed from a UV-curable material. The resulting adhesive is typically a pressure sensitive adhesive (PSA).

Since the label is formed using a printer, it can easily be modified to accommodate different uses.

A plurality of labels is typically formed on a single sheet or web of carrier film, which can be rolled. Each label can then be removed and the adhesive side activated if needed and placed in contact with a container. The carrier film is separated from the film label and can be reused and/or recycled when the label is placed on a container.

BRIEF DESCRIPTION OF THE DRAWINGS

In FIG. 1A, release layers are present on and abut both sides of the carrier film. In FIG. 1B a release layer is present on and abuts only one side of the carrier film.

FIG. 2A shows the label system of FIG. 1A in which the label has been dislodged from the release layers and carrier film, and attached to a container. FIG. 2B shows the label system of FIG. 1B in which the label has been dislodged from the release layer and carrier film, and attached to a container.

FIG. 4A shows a thin film label system in which the overprint and adhesive layers are formed from a single label which is rectangular in shape. FIG. 4B shows a thin film label system in which the overprint and adhesive layers are formed from a single label which is shaped to be present only where indicia are located. In FIGS. 4A and 4B, a single label contains the complete indicia. FIGS. 4C and 4D show thin film label systems formed from a group of three and seven thin film labels, respectively. Each thin film label in a group contains an overprint layer, an adhesive layer, and a portion of the complete indicia for the label system.

DETAILED DESCRIPTION OF THE INVENTION

I. Definitions

Figure 1A:
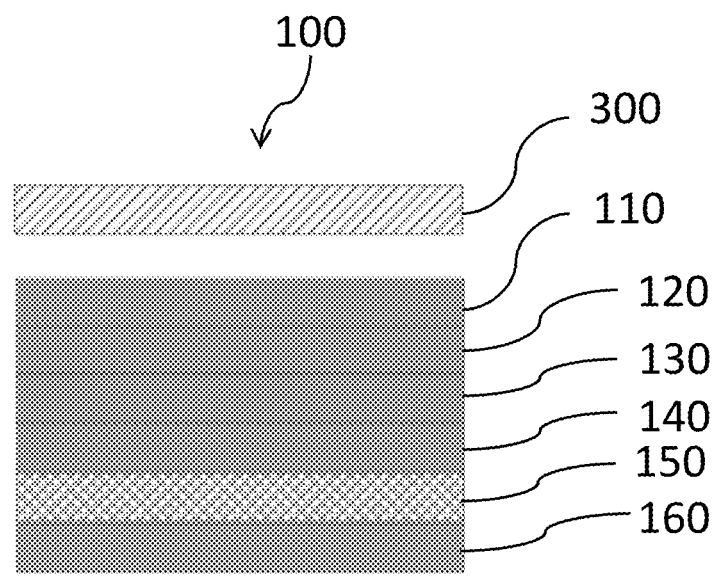
FIGS. 1A and 1B are schematics of a cross-sectional view of a label system prior to placement of the label on a container. The release layers and carrier film are attached to the label.

As used herein the term "thin film label system" refers to a thin film label and its carrier material, including any release liners. When in the form of a system, the carrier material is typically referred to as the "carrier film".

As used herein the term "overprint layer" refers to a layer of material in the thin film label, which covers the indicia when the label is applied to a container. The overprint layer is generally the outermost layer of a thin film label, when the label is applied to a container.

As used herein the term "pressure sensitive adhesives" refers to contact adhesives, which in their dry state at room temperature adhere to a multitude of surfaces after being lightly pressed against them.

As used herein the term "UV cured pressure sensitive coating" refers to a pressure sensitive adhesive, which upon exposure to high-intensity ultra-violet (UV) light results in an adhesive bond with high temperature stability and solvent resistance.

As used herein the term "heat activated/thermosetting adhesive" refers to a thermoplastic adhesive which is activated by heat.

As used herein the term "contact activated adhesive" refers to a pressure sensitive adhesive that requires light hand pressure to adhere to a multitude of surfaces.

As used herein the term "two-part thermoset adhesive" refers to a two-component system, which forms crosslinked polymeric resins that are cured using heat and/or heat and pressure for high strength and chemical resistance.

The terms "styrene acrylic" and "acrylic styrene" as they relate to copolymers are used interchangeably herein to refer to copolymers having the general structure shown below:

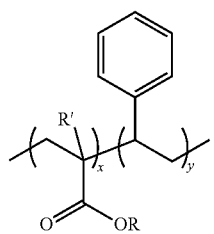

wherein x and y are independently integers from 1 to 1000, each occurrence of R' is independently hydrogen, substituted or unsubstituted alkyl, or substituted or unsubstituted aryl, and each occurrence of R is independently hydrogen, substituted or unsubstituted alkyl, or substituted or unsubstituted aryl. The copolymer can be random, block, branched, or combinations of these. Examples of copolymers of styrene acrylic include, but are not limited to, poly(styrene-co-alkyl methacrylate), such as poly(styrene-co-methyl methacrylate), poly(styrene-co-alkyl acrylate), such as poly(styrene-co-methyl acrylate), poly(styrene-co-methacrylic acid), and poly(styrene-co-acrylic acid)).

The term "elongation to break" refers to ratio of the changed length to initial length when a sample breaks. Elongation to break can be measured using the ASTM D882 standard method.

II. Thin Film Label System

The labels described herein are thin film labels, which have thicknesses of approximately 0.1 mil to 1.5 mil (0.00254-0.0381 mm), preferably the thickness of the label ranges from 0.4 to 0.6 mil (0.0105-0.0152 mm). The thin film labels are typically provided in the form of a roll, where the label is attached to a carrier material. Typically the carrier material is coated on both sides with a first release layer and a second release layer, which allow for the release of the label from the carrier film, when desired.

Figure 1B:
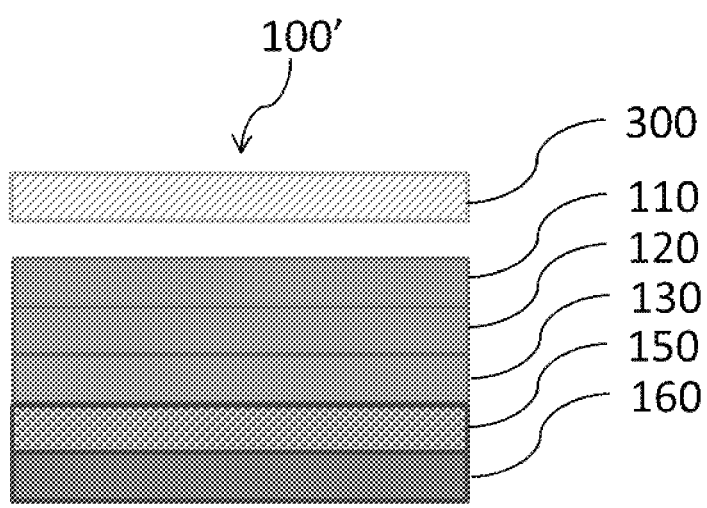

Exemplary thin film label systems, which include the carrier film, are illustrated in FIGS. 1A and 1B. As shown in FIG. 1A, the label system 100 contains an adhesive coating layer 110, an indicia layer 120, an overprint layer 130, a first release layer 160, a carrier film 150, and a second release layer 140. The label system can be applied to a container 300, and the first release layer 160, carrier film 150, and second release layer 140 can be removed. In some embodiments, the second release layer 140 is absent. For example, as shown in FIG. 1B, the label system 100' contains an adhesive coating layer 110, an indicia layer 120, an overprint layer 130, a release layer 160, and a carrier film 150. The label system can be applied to a container 300, and then the release layer 160 and carrier film 150 can be removed from the label.

Figure 2A:
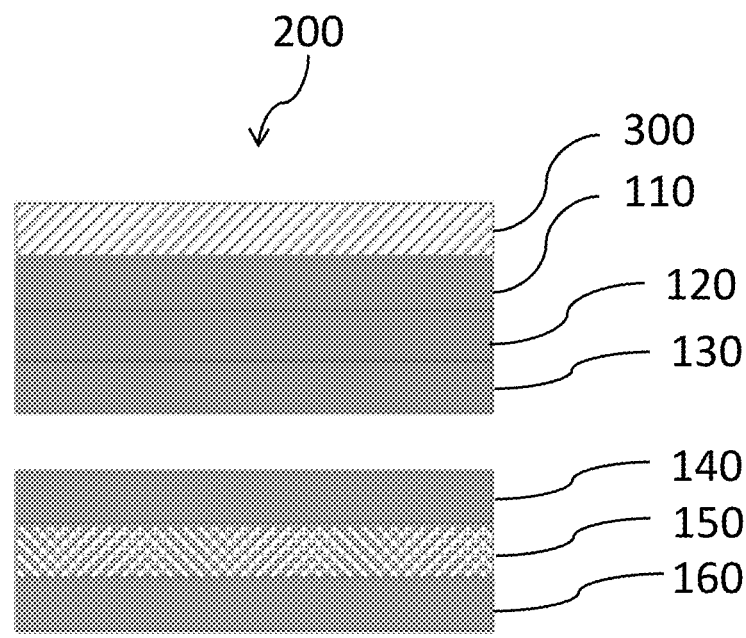
FIGS. 2A and 2B are two schematics of a cross-sectional view of a label following application of the label on a container. The release layers and carrier film are separate from the label, which is attached to the container.
Figure 2B:
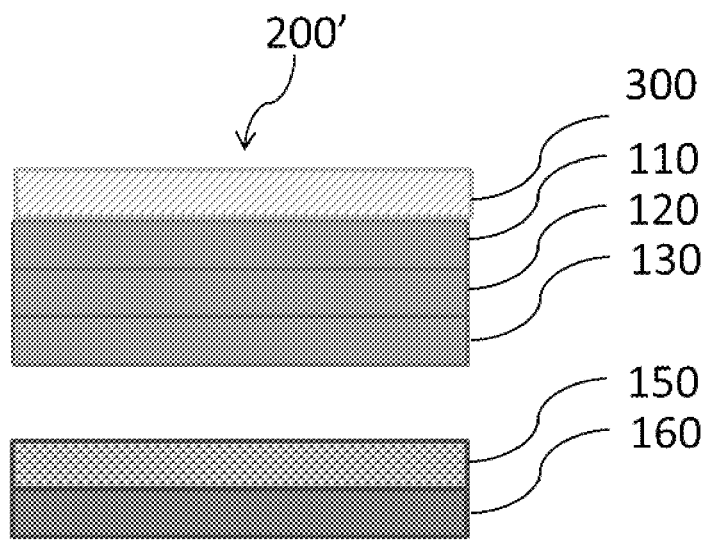

As shown in FIGS. 2A and 2B, the labels 200 and 200' that are each attached to a container 300 contain the adhesive coating layer 110, the indicia layer 120, and the overprint layer 130, where the outer surface of the container is directly in contact with the adhesive coating layer 110, and the overprint layer 130 is exposed. In FIG. 2A, the label 200 has been dislodged from the second release layer 140 and attached to a container 300. In FIG. 2B, the label 200' has been dislodged from the carrier film 150, and attached to a container 300.

1. Thin Film Label a. Overprint Layer

Referring to FIGS. 2A and 2B, the overprint layer 130 is generally the outermost layer of the thin film label 200 or 200', when the label is attached to a container 300.

i. Coating Materials for Forming Overprint Layer

Coating materials suitable for forming the overprint layer include, but are not limited to, a solventless UV-cured system (also referred to herein as a UV-curable precursor composition), water-based or solvent-based systems such as solution polymers or copolymers, one-part polyurethane system, two-part polyurethane system (applied at multiple print or coating stations), hot-melt polymers or copolymers and epoxy systems that can be cured applied at one or multiple print or coating stations.

Hybrid systems combining the aforementioned are also suitable. Further suitable materials include Bayhydrol® UH 240 that is commercially available from Bayer AG as an anionic polyester polyurethane dispersion, Hybridur 570® that is commercially available from Air Products and Chemicals, Inc., as an acrylic-urethane hybrid polymer dispersion, polyurethane dispersions (PUDs), polyethylene (PE) emulsions that are available as nonionic, cationic, or anionic emulsions, acrylic and/or acrylic hybrid emulsion systems, and solvent cast film polymers including, but not limited to, cellulose nitrate, cellulose diacetate, cellulose triacetate, polycarbonates, polyethersulfone, polyetherimide, polyvinylidene fluoride, polyvinyl chloride (PVC), polyimides, polyvinyl alcohol (PVA), methyl cellulose, starch derivatives, gelatin, poly(lactic-co-glycolic acid), copolymers, mixtures of polymers, and combinations thereof. In a preferred embodiment, the coating material for forming the overprint layer is Hybridur 570® or Hybridur 580®.

1. UV-Curable Precursor Compositions

UV-curable precursor compositions typically contain at least one UV-curable precursor material and at least one photoinitiator. Suitable UV-curable precursor materials are able to cure when exposed to UV radiation, preferably one time, for a total exposure energy of 10 mJ/cm$^2$ to 1,000 mJ/cm$^2$, 100 mJ/cm$^2$ to 800 mJ/cm$^2$, most preferably 200 mJ/cm$^2$ to 450 mJ/cm$^2$. Upon exposure to UV radiation, UV-curable precursor composition undergoes a curing process to form the overprint layer via a chemical reaction involving at least one of the UV-curable precursor materials. Preferably, the curing process fully cures or substantially cures the UV-curable precursor materials. Substantially cures refers to a percentage of monomer or oligomer conversion to polymer of at least about 80%, 85%, 90%, 91%, 92%, 93%, 94%, 95%, 96%, 97%, 98%, or 99%. Preferably, the curing process involves a chemical reaction between functional groups of the UV-curable precursor materials. An exemplary functional group is the vinyl group. In some forms, specifically, the functional group is an acrylate (e.g. acrylate), alkacrylate (e.g. methacrylate), or a combination thereof. The UV-curable precursor material may contain one or more types of monomers, one or more types of oligomers, or a combination thereof.

a. Precursor Materials

In some forms, the UV-curable precursor material contains a single functional group that is involved in the curing process, i.e., a monofunctional precursor material. Exemplary monofunctional UV-curable precursor materials include compounds that have a single acrylate or alkacrylate functionality, such as isodecyl acrylate, 2-(2-ethoxyethoxy) ethyl acrylate, dodecyl acrylate, tetrahydrofurfuryl acrylate, isobornyl acrylate, trimethylcyclohexyl acrylate, or polyethylene glycol acrylate. Optionally, the UV-curable precursor composition contains more than one precursor, where each precursor is a monofunctional precursor material, optionally the functional group on each precursors is the same or different.

In some forms, the UV-curable precursor material contains two or more functional groups that are involved in the curing process, i.e., a multifunctional precursor material. In some forms, the UV-curable precursor material is bifunctional, trifunctional, tetrafunctional, pentafunctional, or hexafunctional. In some forms, when a polydispersed UV-curable precursor material, such as an oligomer, is used, the number of functional groups, on average, can be between two integer values, such as between bifunctional and trifunctional, etc. Exemplary multifunctional UV-curable precursor materials include, but are not limited to, compounds that have two or more acrylate functionalities, two or more alkacrylate functionalities, and combinations thereof.

Suitable multifunctional UV-curable precursor materials include, but are not limited to, polyethylene glycol dimethacrylate (e.g. polyethylene glycol (1000) dimethyacrylate), trimethylolpropane triacrylate, neopentyl glycol propoxylate (2) diacrylate, dipropylene glycol diacrylate, triglycerol diacrylate, hexanediol diacrylate, ethoxylated (3) bisphenol A diacrylate, trimethoxylolpropane ethoxy triacrylate, ethoxylated (20) trimethylolpropane triacrylate, ethoxylated (15) trimethylolpropane triacrylate, or combinations thereof.

Preferably, the UV-curable precursor material forms an overprint layer that delaminates cleanly, and passes a chemical resistance test. However, as shown in the examples below, some of the tested precursor materials do not delaminate from the carrier film, or failed the chemical resistance test, or both (Tables 2-5). Alternatively, some of the UV-curable precursor materials form an overprint layer that cleanly delaminates from the carrier film and passes the chemical resistance test (Table 5). Accordingly, in some forms, the UV-curable precursor materials can be dipropylene glycol diacrylate, triglycerol diacrylate, hexanediol diacrylate, or ethoxylated (3) bisphenol A diacrylate, or a combination thereof.

However, failure of the UV-curable precursor materials to form an overprint layer that passes either or both of the tests described above, does not preclude the inclusion of these precursor materials in a UV-curable precursor composition. For instance, UV-curable precursor materials that formed overprint layers that failed the chemical resistance tests can be included in a UV-curable precursor composition to increase the sensitivity of overprint layer to chemicals. This increased sensitivity can be exploited when needed for easy removal, such as during recycling operations. It is understood that in these forms, the UV-curable precursor composition includes at least one material, which forms an overprint layer that delaminates cleanly and passes one, and preferably both chemical resistance tests. Optionally, the UV-curable precursor composition includes at least one material that is listed in Tables 2-5 and forms an overprint layer that delaminates cleanly and passes one, and preferably both chemical resistance tests.

In some forms, the UV-curable precursor composition contains a combination of monofunctional and multifunctional UV-curable precursor materials.

The UV-curable precursor material(s) can constitute between about between about 65% wt/wt and about 97% wt/wt, between about 70% wt/wt and about 95% wt/wt, between about 75% wt/wt and about 95% wt/wt, between about 80% wt/wt and about 95% wt/wt, or between about 85% wt/wt and about 95% wt/wt, of the UV-curable precursor compositions. In some forms, the UV-curable precursor material(s) constitutes about 90% wt/wt to about 97% wt/wt, preferably about 90% wt/wt to about 95% wt/wt, optionally about 91% wt/wt of the UV-curable precursor materials.

b. Photoinitiators

Varying quantities of photoinitiators can be added to the UV-curable precursor compositions to initiate addition reactions, between the monomers and/or oligomers of the precursor materials. An exemplary addition reaction is the free radical initiated polymerization of vinyl groups. In some forms, the photoinitiators can be added as blends of other photoinitiators. Exemplary photoinitiators include, but are not limited to, dimethylhydroxyacetophenone (DMHA), 2,4,6-trimethylbenzoyldiphenylphosphone oxide (TPO), hydroxylcyclohexylphenylketone (CPK), 2,2-dimethoxy-2-phenylacetophenone (DMPA), benzophenone, 2,2-diethyloxyactetophenone, 2,4-diethylthiozanthone, isopropylthioxanthone, 2,4,6-trimethylbenzoyldiphenylphosphine oxide dimethylhydroxyacetophenone, ethyl(2,4,6-trimethylbenzoyl) phenylphosphinate, 2-phenylbenzophenone, methyl-o-benzoyl-benzoate, and methylbenzoylformate, or a combination thereof.

In some forms, the photoinitiator can be a triple blend of DMHA, TPO, and CPK. In some forms, the triple blend contains between about 35% wt/wt and about 45% wt/wt DMHA, between about 25% wt/wt and about 35% wt/wt TPO, and between about 25% wt/wt and about 35% wt/wt CPK. In some forms, the photoinitiator blend contains 40% wt/wt DMHA, 30% wt/wt TPO, and 30% wt/wt CPK.

The photoinitiators constitute between about 0.01% wt/wt and about 20% wt/wt, between about 1% wt/wt and about 20% wt/wt, between about 5% wt/wt and about 15% wt/wt, or between about 5% wt/wt and about 10% wt/wt. In some forms, the photoinitiator constitutes about 9% wt/wt of the UV-curable precursor materials.

c. Solventless

Preferably, the UV-curable precursor composition is solventless, i.e., free of or substantially free of solvent. A composition that is substantially free of solvent has an amount of a solvent that is at most 10% wt/wt of the total weight of the sample, as measured an analytical method such as nuclear magnetic resonance spectroscopy. For example, a solventless UV-curable composition can have solvent present in an amount of less than 5% wt/wt, less than 4% w/wt, less than 3% wt/wt, less than 2% wt/wt, less than 1% wt/wt, less than 0.5% wt/wt, less than 0.1% wt/wt, or 0% wt/wt.

ii. Properties of Coating Containing Precursor Materials

The coating includes monomers, oligomers, or polymers, or a combination thereof that can be in the form of an emulsion, solution, liquid, or solventless composition. The coating solution, liquid or emulsion can be aqueous or solvent-based. The coating may be formed from two or more precursor compositions, or from a single precursor composition. Each of the UV-curable precursor compositions can be sprayed or printed onto the carrier film (or a release layer attached to one side of the carrier film) and cured to form the coating.

The preferred viscosity range of the coating for forming the overprint layer is 0 to 5,000 cps at 25° C., most preferred is 500 to 2,000 cps at 25° C. Preferred percent solids content is 90% wt/wt to 100% wt/wt, 95% wt/wt to 100% wt/wt, preferably 97% wt/wt to 100% wt/wt.

iii. Properties of Dried/Cured Film that Forms the Overprint Layer

Referring to FIG. 1, the dried/cured film forms a continuous, thin overprint layer 130 that is capable of receiving an ink/dye/pigment formulation, possesses good tactile feel and flexibility. The overprint layer 130 can be larger than the indicia, the same size as the indicia, or formulated to be part of the indicia.

This can be accomplished by coating, printing, or casting material onto the carrier film by using a coating unit or a print station on a printing press. The overprint layer can also act as a protective barrier to the indicia to increase durability. The overprint layer also provides resistance to moisture, abrasion or scratch, corrosion by chemicals, and stains.

The overprint layer 130 typically has a low percent haze as measured by ASTM-D1003 and an excellent elongation to break. Preferably the overprint layer has a haze measurement ranging from 0% to 20%, most preferably ranging from 0% to 10%, as determined using a haze meter, such as the "haze-gloss" instrument available from BYK-Gardner.

Excellent elongation to break can be about 50% or greater, about 75% or greater, about 100% or greater, about 125% or greater, about 150% or greater, about 175% or greater, or about 200% or greater as measured by ASTM D882 standard method. Preferably the overprint layer has an elongation to break of 200% or greater.

The overprint coating preferably has good wet-out onto the release carrier substrate and has medium adhesion to the surface of the release liner. For good wet out, the surface energy of the overprint coating closely matches the surface energy of the surface to be coated. For example, when coating polyester films with a surface energy of 42 dyne/cm, the preferred surface energy range of the overprint coating is 40-45 dynes/cm. Surface energy can be measured experimentally via contact angle measurements with a goniometer and tensiometer (such as available from Ramé-Hart). Good wet out can also be visually determined. Coatings with good wet out form a consistent film free of voids, ridges, and other visual distractions. Poor wet out is characterized by inconsistent film forming, showing orange peel effects, voids, patterns, ridges, beading or other visually distracting effects.

Medium adhesion of the overprint layer to the release layer or carrier film can be measured by the force required to separate the two layers. The "separation" force, referred to as the delamination peel force, can be measured by ASTM method D-3330. A suitable force to achieve medium adhesion between the overprint layer and the carrier film (or a release layer on the carrier film) is greater than 0 g/in (0 g/mm), such as 0.01 g/mm or greater or 0.1 g/mm or greater, optionally, the delamination peel force is 0.02 g/mm or greater, 0.03 g/mm or greater, 0.04 g/mm or greater, 0.05 g/mm or greater, 0.06 g/mm or greater, 0.07 g/mm or greater, 0.08 g/mm or greater, or 0.09 g/mm or greater. However, generally the delamination peel force between the overprint layer and the carrier film (or a release layer on the carrier film) does not exceed 127 g/in (5 g/mm) or 76.2 g/in (3 g/mm). A suitable delamination peel force range to achieve medium adhesion between the overprint layer and the carrier film (or a release layer on the carrier film) is from 0.01 g/mm to 5 g/mm, optionally from 0.01 g/mm to 3 g/mm; in some labels, a suitable delamination peel force range to achieve medium adhesion between the overprint layer and the carrier film (or a release layer on the carrier film) is from 0.1 g/mm to 5 g/mm, optionally from 0.1 g/mm to 3 g/mm.

The adhesion forces between the adhesive layer and the surface of the container must be greater than the adhesion forces between the overprint layer and the carrier; however, the adhesion forces between the overprint layer and the carrier film must be greater than the adhesion forces between the adhesive layer the backside of the carrier film (or a second release layer). This allows the system to be self-wound without causing premature blocking or delamination of the thin label, while still allowing the thin label to be transferred from the carrier to the container during the application process.

The overprint layer releases cleanly from the release layer or carrier film (i.e., in the absence of a release layer at the interface of the overprint layer and carrier film). "Releases cleanly" generally means that the overprint layer delaminates evenly and without defect from the release layer or carrier film and is free of debris and buildup as evaluated by visual inspection.

Delamination peel force values of 5 g/mm or less coupled with higher load mean force values, such as 10 g or greater, generally provide overprint layers that have durable film qualities during transfer of the overprint label system from the carrier film to the container or substrate.

Optionally, the overprint layer is chemically resistant to common cleaning agents, such as isopropanol, methyl ethyl ketone, water, ethanol, propanol, acetone, glycol ethers, vegetable oil, naphtha-based press wash solutions, petroleum-based press wash solutions, lacquer thinner, and turpentine. As a non-limiting example, chemical resistance can be demonstrated using a Crock Meter Rub tester fitted with cheese cloth on the rubbing surface, where overprint layer film samples, saturated with either methyl ethyl ketone or isopropyl alcohol, are mechanically rubbed for 50 double rubs. Dissolution or damage to the overprint layer film before 50 rubs or at 50 rubs indicates that the overprint layer is not chemically resistant, while samples that do not show any damage after 50 double rubs are considered to have an overprint layer with chemical resistance.

Further the release layer or carrier film is smooth and undisturbed as evaluated by visual inspection.

iv. Materials in Overprint Layer

The overprint layer typically contains one or more polymers. In some forms, the polymers are homopolymers or co-polymers. The co-polymers can be block co-polymers, alternating co-polymers, graft co-polymers, or random co-polymers. Further, the homopolymers or co-polymers can be linear polymers, branched polymers, cross-linked polymers, or combinations thereof. For example, the co-polymer can contain one more linear segments and one or more cross-linked segments.

Following curing of a UV-curable precursor composition that was coated onto one side of the carrier film (or a release layer that is on one side of the carrier film), the resulting coating is an overprint layer. The polymers in the overprint layer can be formed from the monofunctional and/or multifunctional precursor materials described above. Accordingly, suitable polymers that form the overprint layer include poly(acrylate) polymers, poly(alkacrylate) polymers, poly(urethane) polymers, poly(urethane acrylate) polymers, poly(ethoxylated acrylate) polymers, and saturated or unsaturated poly(urethane acrylate) polymers, and co-polymers and combinations thereof.

Exemplary polymers that can be present in the overprint layer include poly(isodecyl acrylate); poly(2-(2-ethoxyethoxy) ethyl acrylate); poly(dodecyl acrylate); poly(tetrahydrofurfuryl acrylate); poly(isobornyl acrylate); poly(trimethylcyclohexyl acrylate); poly(polyethylene glycol acrylate); poly(polyethylene glycol dimethacrylate), e.g. poly(polyethylene glycol (1000) dimethyacrylate); poly(trimethylolpropane triacrylate); poly(neopentyl glycol propoxylate (2) diacrylate); poly(dipropylene glycol diacrylate); poly(triglycerol diacrylate); poly(hexanediol diacrylate); poly(ethoxylated (3) bisphenol A diacrylate); poly(trimethoxylolpropane ethoxy triacrylate); poly(ethoxylated (20) trimethylolpropane triacrylate); and poly(ethoxylated (15) trimethylolpropane triacrylate); and co-polymers and combinations thereof. Preferably, the overprint layer contains poly(dipropylene glycol diacrylate), poly(triglycerol diacrylate), poly(hexanediol diacrylate), poly(ethoxylated (3) bisphenol A diacrylate), or poly(trimethoxylolpropane ethoxy triacrylate), or a co-polymer or a combination thereof.

v. Optional Coating on Overprint Layer

Optionally, a further coating is placed on top of the overprint layer. Suitable materials for coating the overprint layer 130 include, but are not limited to, low molecular weight PVC plasticized with Palamoll® 652 and cast from tetrahydrofuran (THF), water based polyurethane systems (optionally diluted with PVA or other water based systems to get better release from film), materials in the Hybridur® Series 878 (N-methyl-2-pyrrolidone (NMP)-free aliphatic urethane-acrylic hybrid polymer dispersion), 570 (an acrylic-urethane hybrid polymer dispersion), 870 (NMP-free anionically stabilized acrylic urethane hybrid polymer dispersion), 580 (an acrylic-urethane hybrid polymer dispersion), Sancure® 20041 (alphatic polyurethane dispersion), Impranil® DL 1537 (anionic aliphatic polyester-polyurethane dispersion), Carboset® 514H (acrylic colloidal dispersion polymer in ammonia water), Neocryl® A-1120 (solvent free, high solids, modified acrylic styrene copolymer dispersion), Joncryl® 544 from BASF (self-crosslinking acrylic emulsion), Dur-O-Set® E-351 (vinylacetate ethylene copolymer emulsion), and combinations thereof.

b. Indicia Layer

The indicia layer 120 is formed from an ink/dye/pigment formulation that is applied to the overprint layer 130. The ink/dye/pigment formulation includes carrier solvents and materials dissolved in the solvents. The ink/dye/pigment formulation can be applied and dried onto the overprint layer 130 or diffuse into the overprint layer 130. The ink/dye/pigment formulation can be added after the overprint layer 130 is dried/cured or while the overprint layer 130 is drying/curing.

The indicia layer can be formed with a number of techniques common to the art of offset sheet and web based printing. This includes, but is not limited to, flexographic printing, offset printing, digital printing, laser printing, inkjet printing, heat-set printing, gravure printing, and screen printing. Each technique provides a plurality of different ink/dye/pigment options that are compatible with this system and typical for to the art of label printing.

i. Materials

Suitable materials that can be dissolved in the carrier solvents include, but are not limited to, a resin, a surfactant and a colorant.

a. Solvent

Generally, the solvent can be any material that can dissolve and/or disperse the resin and other materials in the ink/dye/pigment formulation.

Depending on the choice of a substrate for which an ink/dye/pigment formulation is targeted, a solvent (such as an organic solvent) can be selected based on the evaporation rate of a solvent. Certain non-aqueous inks have been disclosed in U.S. Patent Application Publication Nos. US 2005/0039634 to Hermansky, US 2009/0246377 to Robertson, et al., and US 2010/0098860 to Robertson, et al. and in published PCT applications WO 2010/042104 to Barreto, et al. and WO 2010/042105 to Barreto, the entire contents of which are incorporated herein by reference.

The evaporation rate of a solvent can typically be determined by the ASTM method D3359, and can be reported as a relative evaporation rate (RER), usually relative to n-butyl acetate. Based on this RER, the solvents can be grouped in a manner depending on the application envisioned. The solvents are categorized as a fast, intermediate and a slow solvent according to their RERs: solvents having a RER greater than 1.0 can be grouped as fast solvents; solvents having a RER from about 1.0 to about 0.01 can be grouped as intermediate solvents; and solvents having a RER less than about 0.01 can be grouped as slow solvents. The RERs can typically be correlated with the volatility of a solvent. A fast solvent typically evaporates faster and can lead to rapidly increasing viscosity of an ink. Although a solvent may be mentioned as a single chemical entity, derivatives of such solvents can include its structural isomers and other oligomers. The organic solvents described herein, may be used either in an anhydrous or wet form.

Examples of fast solvents can include methanol, ethanol, propanol, isopropanol, acetone, methyl ethyl ketone, methyl isobutyl ketone, pentane, hexane, heptane, methyl acetate, ethyl acetate, propyl acetate, tort-butyl acetate, tert-butanol, tetrahydrofuran, and their mixtures.

Examples of intermediate solvents can include $C_{4-8}$ alcohols (e.g., butanol, pentanol, hexanol, heptanol, octanol, and the like), propylene glycol ethers (e.g., propylene glycol mono methyl ether, propylene glycol mono ethyl ether, propylene glycol n-propyl ether, propylene glycol n-butyl ether, and the like), dihydric alcohols (e.g., ethylene glycol, propylene glycol, butylene glycol, and the like), 1-methoxy-2-acetoxy propane, cyclohexanone, and their mixtures.

Examples of slow solvents can include, but are not limited to, glycol ethers having at least about 10 carbon atoms (e.g., at least about 11 carbon atoms, at least about 12 carbon atoms, at least about 13 carbon atoms, at least about 14 carbon atoms, or at least about 15 carbon atoms), dipropylene glycol methyl ether, dipropylene glycol methyl ether acetate, dipropylene glycol n-butyl ether, tripropylene glycol monomethyl ether, tripropylene glycol-n-butyl ether, propylene glycol phenyl ether, and their mixtures. The RERs of certain glycol ethers have been reviewed by Smith, R. L., in *Environmental Health Perspectives*, Vol. 57, pp. 1-4 (1984), the entire disclosure of which is incorporated herein by reference. Examples of commercial solvents include "Dowanol TPM tripropylene glycol methyl ether," and "Dowanol PM propylene glycol methyl ether" available from Dow Chemical (Midland. Mich.).

The approach described above, using different types of solvent, is well suited to develop conventional printing inks. Also contemplated are materials and approaches employed to develop other types of printing inks, such as toner inks for a laser printer. For example, U.S. Pat. No. 8,206,884 to Yang, et al., describes a method for preparing toner using micro-suspension particles, the entire contents of which are incorporated herein by reference.

b. Resin

The resin typically provides the ink/dye/pigment formulation with a desired viscosity, thermal stability, flexibility, and adhesion properties. Examples of resins include, but are not limited to, rosin modified phenolic resins, phenolic resins, styrene-acrylic resins, polyketone resins, derivatives thereof, or mixtures thereof. The inks optionally include other types of resins, such as polyvinyl butyral (PVB), acrylic, polyurethane, polyamide, polyvinylpyrrolidone (PVP), or vinyl resins, acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; a rosin glycerol ester; an ethylene vinyl acetate (EVA); a polyamide resin; ethylene oxide polymer and its adducts; ethylene oxide/propylene oxide copolymer and its adducts; galbanum resin; gellan gum; ghatti gum; gluten gum; guaiac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene (min. MW 37,000); polymaleic acid; polyoxyethylene derivatives; polypropylene glycol (MW 1200-3000); polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

Examples of commercial resins include the Joncryl family of resins (available from BASF), Reactol K3107 (a phenolic resin from Hexion), Resin SK (a polyketone resin from Evonik), Alnovol PN320 (a novolak phenolic resin from Cytec), Laropal A81 (an aliphatic aldehyde resin from BASF), and Foral 85 hydrogenated rosin ester resin, available from Hercules Chemical Company, Inc.; 111 South Street, Passaic, N.J. 07055. Preferred molecular weights for these polymers range from 150,000 daltons to 1,000,000 daltons, more preferably from 200,000 daltons to 500,000 daltons.

c. Surfactant

Optionally, the ink/dye/pigment formulation includes one or more surfactants. The surfactant(s) can serve to alter the surface tension of the ink/dye/pigment formulation. Suitable types of surfactants include, but are not limited to, anionic (such as sulfate esters, carboxylates, sulfonates, or phosphonates), cationic, nonionic (such as polyol based, polyglycerols based, fluorocarbon based, siloxane-based, alkyl phenol based, or polyoxyethylene based) or amphoteric (such as phosphatides, imidazoline derivatives, or betaines) surfactant compounds, such as those described in "Surfactants and Interfacial Phenomena," Second Edition, M. J. Rosen, 1989, John Wiley and Sons, Inc., New York, pages 1-32, the contents of which are incorporated herein by reference.

The inclusion of a surfactant within an ink/dye/pigment formulation can lead to a barrier in the form of a layer of surfactant at the interface of air and bulk ink, thereby reducing, and preferably substantially eliminating, the ability of the solvent to evaporate from the bulk ink/dye/pigment formulation. By reducing the solvent evaporation rate, and preferably entirely preventing solvent evaporation of the ink/dye/pigment formulations, the decap time can be increased. At the same time, once an ink/dye/pigment formulation is placed onto a substrate, fast evaporation (i.e., fast drying time) can occur because the surfactant molecules can spread out over a larger surface area instead of being confined to a surface that is under tension.

Fluorosurfactants are surfactants that can either be ionic (with the fluorine-containing moiety being part of either the cationic or the anionic part) or nonionic (such as fluorocarbon chain-containing alcohols). The fluorosurfactants can be ethoxylated surfactants (i.e., polyethyleneoxide modified) or polytetrafluoroalkylene surfactants. Ethoxylated surfactants include one or more of ethylene oxide monomeric units, Polytetrafluoroalkylene surfactants include one or more of tetrafluoroalkylene units. Examples of fluorosurfactants include polyethylene oxide-b-poly(tetrafluoroethylene) polymers, 2-(perfluoroalkyl)ethyl stearate, anionic lithium carboxylate fluorosurfactant, anionic phosphate fluorosurfactant, anionic phosphate surfactant, amphoteric quaternary ammonium-acetate fluorosurfactant, fluoroaliphatic polymeric esters, their derivatives, and their mixtures. Examples of commercial fluorosurfactants include Zonyl family of fluorosurfactants (e.g., Zonyl FSO 100, Zonyl FSN, Zonyl FTS) and Capstone family of fluorosurfactants (available from DuPont Chemicals, Wilmington, Del.), or Fluorad FC 170-C, FC171, FC430 and FC431 available from 3M of St. Paul, Minn. Hermansky (see above) discloses the complete drying of the inks in the presence of Zonyl FSX surfactant.

Siloxane-based surfactants are surfactants which can be copolymers of silyl ethers and epoxy (ethylene oxide, propylene oxide) oligomers or polymers. Examples of siloxane-based surfactants include polysiloxane-b-ethylene oxide, polysiloxane-b-propylene oxide, polysiloxane-b-propylene oxide/ethylene oxide, their derivatives, and their mixtures. Examples of commercial siloxane-based surfactants include copolymers such as SILWET® copolymers including Silwet L-7604, available from GE Silicones; Troysol Q-148 and 5366 available from Troy Chemical.

Acetylenic diol-based surfactants are surfactants which can be acetylenic dials comprising hydrophobic groups at the end of the acetylenic spacer and hydrophilic and/or hydrophobic ethers hanging off of the hydroxyl groups. Examples of acetylenic diol-based surfactants include, 2,4, 7,9-tetramethyl-5-decyne-4,7-diol (TMDD), 2,5,8,11-tetramethyl-6-dodecyne-5,8-diol, their derivatives, and their mixtures. Examples of commercial acetylenic diol-based surfactants include Dynol series (Dynol 604) and Surfynol series (Surfynol 104, 420, 465, 485, TG-E, SE, etc.) available from Air Products.

Hydrocarbon-based surfactants are surfactants which can be polyoxyethylenated alkyl phenols (APE type), polyoxyethylenated short chain alcohols (AE type), or long chain organic acid esters. Examples of hydrocarbon-based surfactants include polyoxyethylene (10) isooctylcyclohexyl ether, (1,1,3,3-tetramethylbutyl)phenyl-polyethylene glycol, polyethylene glycol tert-octylphenyl ether, polyoxyethylenesorbitan monopalmitate, their derivatives, and their mixtures. Examples of commercial hydrocarbon-based surfactants include Triton X Series and Tergitol Series, both from Dow Chemical; the TWEEN Series from ICI Americas; and the Igepal Series from Hallstar.

d. Colorants

The ink/dye/pigment formulation may include a colorant, which provides color to the ink/dye/pigment formulation. The ink/dye/pigment formulation can contain a sufficient amount of a colorant that the ink/dye/pigment formulation has color, but not so much as to interfere with other desirable qualities, such as surface tension or viscosity.

An ink/dye/pigment formulation can include one or more colorants (e.g., one or more pigments, one or more dyes, or their mixtures). Colorants can provide an ink/dye/pigment formulation with, for example, a desired color and/or opacity. Exemplary colors can include black, cyan, magenta, yellow, red, blue, green, brown, or their combinations.

Examples of suitable pigments include Color Index Pigment Black 7; Pigment Blue 15; Pigment Red 112, 146, 170 and 208; Pigment Yellow 17 and 83; Pigment Green 7; carbon black, graphite; and pigment white titanium dioxide. Additional examples are disclosed in, U.S. Pat. No. 5,389,133 to Xerox Corporation, the entire contents of which are incorporated herein by reference. The pigment may also have a modifying group on its surface, such as an oxygen-containing functionality (e.g., a carboxyl or phenol group). An example of a commercially available pigmented colorant can be "Special Black 4A" available from Evonik Degussa (Germany).

Examples of dyes include Orasol Pink 5BLG, Black RLI, Blue 2GLN, Red G, Yellow 2GLN, Blue GN, Blue BEN, Black CN, and Brown CR (all available from Ciba-Geigy, Inc., Mississauga, Ontario); Morfast Blue 100, Red 101, Red 104, Yellow 102, Black 101, and Black 108 (all available from Morton Chemical Company, Ajax, Ontario); and a mixture thereof.

e. Other Modifying Agents in the Ink/Dye/Pigment Formulations

The ink/dye/pigment formulations can contain smaller amounts of other ingredients without hindering the desired properties of the inks. Such ingredients include, but are not limited to, dispersants, anti-foaming agents, wetting agents, viscosity modifiers, and light stabilizers.

ii. Properties

The indicia layer 120 provides decoration to the substrate, information about the contents of the labeled container, or both. In some embodiments, the indicia layer in a single label provides the complete indicia, i.e. the desired decoration to the substrate, information about the contents of the labeled container, or both. In this instance, the overprint layer 130, the adhesive layer 110, or both, each form a continuous layer upon Or under which the indicia layer 120 is located. Preferably, both the overprint layer 130 and the adhesive layer 110 form continuous layers. See, FIGS. 4A and 4B.

In other embodiments, the information and/or design on a group of labels when assembled together provides the complete indicia. See, e.g. FIGS. 4C and 4D. In these embodiments, each indicia layer in each of the labels in the group provides a portion of the indicia in the complete indicia. The complete indicia is located on and/or under discontinuous regions that contain an adhesive layer upon which a portion of the complete indicia is located. When assembled together on a substrate, the group of labels define regions on the substrate where a label is located, and each label is separated from another label by a region of the substrate that does not contain a label (or an adhesive layer, or overprint layer, or both).

The addition of surfactants to the ink/dye/pigment formulation used to produce the indicia layer 120 can provide an extended decap time without compromising the drying time on a substrate. Surfactants can also alter the viscosity of the formulations and can further prevent the viscosity of the formulations from altering.

Viscosity ranges of the inks are very wide and depend on printing method. Offset printing inks typically range in viscosity from 40,000 to 100,000 cps at 25° C. Gravure and flexographic printing inks typically range in viscosity from 50 to 500 cps at 25° C.

b. Adhesive Layer

Referring to FIGS. 2A and 2B, the adhesive layer 110 covers the indicia layer, and forms the innermost layer of the label system when the label is in contact with a substrate, such as a container 300. The adhesive layer 110 provides sufficient adhesive force to attach the label to the desired container substrate. This includes enough force to delaminate or transfer the overprint layer and indicia layer from the release carrier to the container and maintain enough force to secure the label to the container. The type and strength of the adhesive layer determines the type of release coating or treatment on the carrier film.

Optionally, a layer can exist between the indicia layer and the adhesive layer to provide barrier properties to the indicia from the adhesive or to provide a priming effect for the adhesive.

The adhesive composition used to form the adhesive layer can be a pressure sensitive adhesive (PSA), such as a clear water-based pressure sensitive coating, UV curable pressure sensitive coating, heat activated/thermosetting adhesive, contact activated adhesive, two-part thermoset adhesive and/or fluid activated adhesive. Approaches to apply the adhesive layer to the indicia layer include, but are not limited to, utilizing a printing press or coating station on a printing press.

i. Materials

The adhesive compositions can contain a single polymer (e.g., homopolymers, copolymer, terpolymer, etc.) or a mixture of polymers, such as homopolymers, copolymers, terpolymers, etc., and combinations thereof.

a. Pressure Sensitive Adhesives

In some embodiments, the adhesive layer contains a pressure sensitive adhesive (PSA) and one or more tackifiers. These adhesives may be used to reduce the contact pressure required to bond the layers together, and/or increase the adhesion between the layers. PSAs include polymers such as polyethylenes, polysiloxanes, polyisobutylenes, polyacrylates, polyacrylamides, polyurethanes, plasticized ethylene-vinyl acetate copolymers, and tacky rubbers such as polyisobutene, polybutadiene, polystyrene-isoprene copolymers, polystyrene-butadiene, neoprene (polychloroprene), copolymers, and mixtures of polymers.

Exemplary UV-curable precursor materials for forming a pressure sensitive adhesive include Rad Bond 12PSFLV, Rad Bond 12PS12LVFB, and Rad Bond 12PS2HTLV.

b. Fluid Activatable Adhesive Compositions

In some embodiments, the adhesive layer is a non-tacky fluid activatable adhesive. Exemplary fluid activatable adhesives and their corresponding activation agents are described in pending application, U.S. Pat. No. 9,254,936, the disclosure of which is incorporated by reference in its entirety.

iii. Properties

The adhesive layer can be applied to glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyvinyl chloride (PVC) and polyvinyl chloride films, and TYVEK®, as well as other low energy and thermoplastic substrates. The adhesive layer can also be applied to paper, cardboard, or metal surfaces.

The adhesive layer provides good adhesion to the desired substrate. It is also optically clear. The adhesive layer is preferably formulated for caustic removability, such that the container and label can be separated in a recycling plant or bottle washer.

For example, the adhesion of the adhesive layer to the substrate is sufficiently strong to require a peel force value to separate the adhesive layer from the substrate that is at least about 10 times, at least about 20 times, at least about 30 times, or at least about 35 times greater than the delamination force required to separate the carrier film from the overprint layer. Optionally, the adhesion between the adhesive layer to the substrate is even stronger, for example the peel force value required to separate the adhesive layer from the substrate can be at least about 100 times greater, or at least about 200 times greater than the delamination force required to separate the carrier film from the overprint layer.

d. Carrier Film

The carrier film provides a base that can support the overprint layer during the printing and application processes. The starting material for the carrier film optionally has one or more release coatings already applied to its surfaces. Optionally, the carrier film is coated on its upper and/or lower surfaces with release coatings, where the release coating on the lower surface (first side) allows for easier release of the adhesive layer compared to the release of the overprint layer from the release coating on the upper side (second side) of the carrier film.

i. Materials

Suitable materials that can be used to produce the carrier film include, but are not limited to, polyethylene terephthalate (PET), polyethylene (PE), polypropylene (PP), polystyrene (PS), polyesters, polyamides, polyvinyl chloride, copolymers such as styrene/acrylonitrile copolymers, ethylene/propylene copolymers, styrene/acrylonitrile copolymers, ethylene/butene-1, copolymers, ethylene/ethyl acrylate copolymers, ethylene/methyl methacrylate copolymers, ethylene/vinyl acetate copolymers.

ii. Properties

The carrier film is preferably flexible, low cost and strong. Carrier films are available with a variety of coatings/treatment to allow for the proper release of the adhesive layer when the label construction is wound or rolled such that the adhesive layer is in contact with the carrier film.

iii. Release Coatings on One or Both Sides of the Carrier Film

Referring to FIG. 1A, a first release layer 160 and a second release layer 140 are applied to opposite sides of the carrier film 150. The overprint layer 130 is in contact with a second release layer 140. When two or more label systems are arranged in a rolled or stacked form, the adhesive layer 110 is in contact with the first release layer 160 of the system and/or the first release layer of an adjacent system in the set. Thus the first release layer 160 prevents the adhesive coating layer 110 from strongly adhering to the carrier film 150 of the same label system or the carrier film of an adjacent label system.

Referring to FIG. 1B, a second release layer 140 is not applied to the carrier film 150 (i.e. only one release layer is present). In this embodiment, the surface of the carrier film has inherent release properties, which allows the overprint layer to delaminate from carrier film using a suitable peel force. Optionally the material that forms the carrier film 150 is PET, PP, or PS.

Referring to FIG. 2A, after the label system is applied to a container 300 via the adhesive coating layer 110, the second release layer 140 facilitates the detachment of the carrier film 150 from the label 200. The overprint layer 130 becomes the outermost layer of the label 200.

In FIG. 2B, the second release layer 140 is not present. Thus, after the label system is applied to a container 300 via the adhesive coating layer 110, the carrier film 150 is peeled off of the overprint layer 130.

The first release layer and second release layer may not, and often do not, have the same levels of release. In some embodiments, the first release layer and second release layer are formed from the same materials, but with different percent compositions or viscosities. In other embodiments, the first release layer and second release layer are formed from different materials.

e. Release Layers i. Materials

Suitable materials that can be used to produce the release layers include, but are not limited to, silicone, high density polyethylene (PE), medium density PE, low density PE, polypropylene (PP), polytetrafluoroethylene (PTFE), acrylated silicone, polyesters, PET, polyethylene naphthylene, polyamides, co-polymers and mixtures thereof.

ii. Properties of Release Coatings a. First Release Layer

Referring to FIG. 2A, the first release layer 160 can be formulated to resist blocking with the adhesive layer 110 when the label system is wound, rolled or stacked, resist moisture, or both, i.e., resist blocking and moisture.

b. Second Release Layer

Referring to FIG. 2A, the second release layer 140 can be formulated such that there is no hazing on the overprint layer 130 after the label 200 is transferred to a substrate, such as a container 300. In some embodiments, in which the surface of the carrier film has inherent release properties, the second release layer 140 is absent (see, e.g. FIG. 2B).

III. Methods of Making Thin Film Labels with Indicia

The starting materials for forming the thin film labels described herein are a carrier film with or without release characteristics already applied to it. The label is built from a coating that becomes the overprint layer using standard coating and/or printing presses and techniques. This allows for a very small amount of material (relative to an extruded film) to be utilized. As this material is coated or printed directly onto the carrier film, its low caliper does not create the handling challenges typically associated with thin film extrusion and lamination.

The method for forming the thin film labels uses standard printers to build a label using coatings and inks typical to the industry, bypassing expensive lamination processes.

Figure 3:
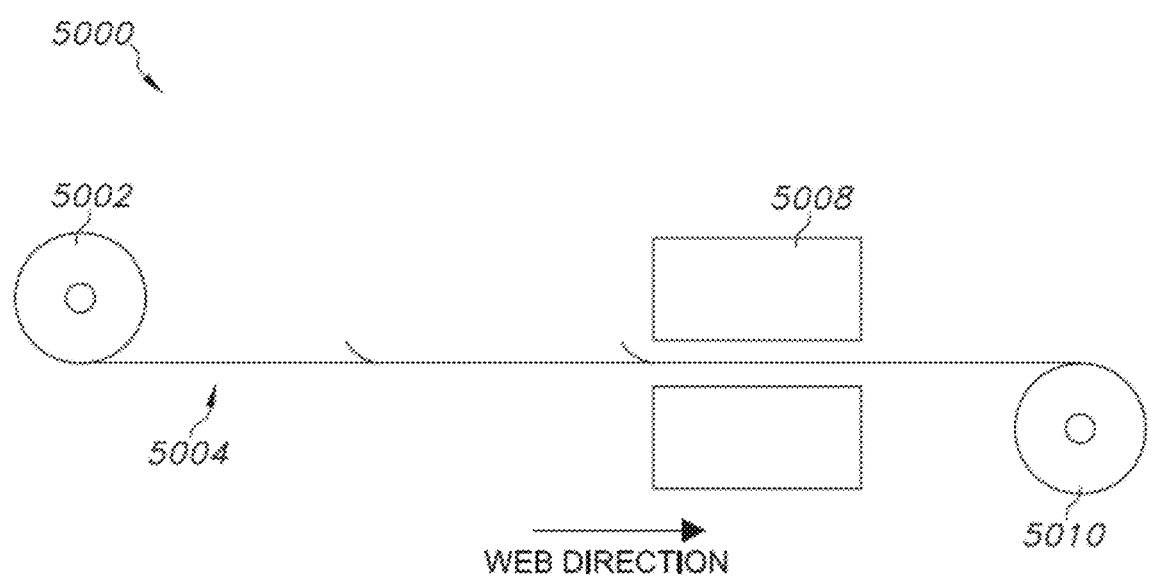
FIG. 3 illustrates a schematic view of an exemplary manufacturing process utilizing a generally continuous web.

An exemplary manufacturing process for forming the thin film labels with indicia is depicted in FIG. 3.

A schematic view of an example manufacturing process 5000 of the various steps associated with forming the thin film labels described herein is illustrated utilizing a generally continuous web 5004. A carrier film 150 can be provided as a generally continuous web that can be processed through a "reel-to-reel" style manufacturing process.

For example, the carrier film can be provided as a generally continuous web 5004 from a source station 5002, which can be a source roll or the like. Some or all of the various processing steps, such as, for example, the steps of coating a material onto the carrier film to form the overprint layer, can then be performed by passing the generally continuous web 5004 through a printing station 5008. Though only a single printing station 5008 is illustrated. However, it is to be understood that multiple printing stations can be utilized. In addition or alternatively, though not illustrated, the process 5000 can be adapted to pass the web 5004 through the printing station 5008 in multiple passes. For example, the indicia can be print on top of the overprint layer by passing the web through the printing station one or more times. Finally, the completed plurality of label systems on the generally continuous web 5004 can be collected at a take-up station 5010, which can include a collection roll to form a rolled label system, as well as finishing equipment, including die-cutting and matrix stripping equipment.

The manufacturing process 5000 can include various other stages, steps, etc. For example, pre-processing and/or post-processing stations, steps, etc. can also be included. It is to be understood that the additional equipment may be provided (e.g., idler rollers, tension rollers, turn-bars, slit or perforators, etc.) to facilitate the "reel-to-reel" process.

1. Coat or Print Coating Material onto Carrier Film

Any suitable printing technique and system can be used to coat or print the carrier film with the material for forming the overprint layer. Examples of suitable techniques include web coating and printing techniques, including, but not limited to gravure, reverse gravure, slot die, rod, knife-over-roll, flexographic, rotary screen, offset coating, or offset lithography.

For example, a typical flexographic or gravure printing press may be used to coat a carrier film with one or more layers of press printable/coatable coatings.

The carrier film is coated, flood printed, or spot printed with a sufficient amount of a polymeric material to form an overprint layer. This is preferably accomplished at a single print or coating station, but can take place across one or more stations. Alternatively, the overprint layer may be prepared prior to the printing process in a wide-web or larger format construction. Coating or printing the layer directly on the carrier allows for the label to be built on the carrier web on the coating or printing equipment. This allows for flexibility in choosing the thin label material and a reduction in complexity of the supply chain of label material. It also provides for a reduction in the amount of material required. Typical thin film labels that are made using prior art methods may be as thin as 1.2 to 3.5 mils (0.0305-0.0889 mm). In contrast, the films described herein are thinner, with typical label thicknesses ranging from 0.1 to 1.5 mils (0.00254-0.0381 mm).

i. Printing

The thin film labels can also be produced using consumer or commercial laser printing techniques. Laser print engines are able to deposit indicia and coating in registration onto carrier film webs or sheets using an electrostatic digital printing process.

Laser printing produces high resolution text, graphics, and coatings by repeatedly passing a laser beam back and forth over a negatively charged cylinder or drum to define a differentially-charged indicia or transfer region on the drum. The drum then selectively collects electrically charged powdered resin and pigment formulations (toner), and transfers the toner to the web or sheet. The toner and sheet then typically pass over a fuser that heats the toner allowing it to melt and form a continuous or semi-continuous polymeric film, typically containing pigments or dyes.

Toner can generally be described as mono-component magnetic, mono-component non-magnetic, or dual component. Despite these different categories, which are based upon the type of development process used in the laser print engine, all powder toners contain a polymeric resin. Most also contain a colorant and a series of additives having a variety functions.

The polymeric resin is the ingredient of the toner that represents the major proportion of any toner composition. Depending on the type of toner composition, the composition of the polymer ranges between 40 and 95% by weight of the toner composition. Typically, the function of the polymer is to act as a binder to carry and hold the colorant on the final printed sheet or web. In this example, the toner from a specific print station or drum can act as a traditional binder or can also act as the overprint layer. When acting as an overprint layer, the polymers are deposited onto the web or sheet, and fused, followed by the deposition of additional layers on top of the overprint layer to form the thin film label. The label is initially adhered to the web or sheet, but will eventually be delaminated when the label is transferred from the carrier web or film onto a desired container or substrate.

Toner formulations that can be used to produce the thin film labels contain amorphous polymers that have a glass transition temperature (Tg) from about 20° C. to about 80° C., or from about 40° C. to about 70° C., preferably from about 50° C. to about 70° C.

Exemplary polymers that act as both a binder and an overprint layer include: resins formed from copolymers of styrene acrylic, poly(styrene-co-butadiene), polyester resins, HDPE, LDPE, and PP.

In addition to polymers, a toner formulation for a thin film label also contains a charge control agent that enables the charge characteristics of the toner to be fine-tuned, a flow control additive (for example fumed silica) to prevent the toner from caking, and a wax to prevent the toner from sticking to the heated fuser rollers.

Polyesters have the advantages of giving the toner a lower minimum fix temperature, while maintaining a higher Tg. Styrene/acrylic copolymers, such as those described above, have the advantage of possessing a lower humidity sensitivity, which translates into a more robust performance in a variety of environmental conditions. As this layer, is the outermost layer once the label is transferred or applied to a container, humidity resistance for wet environments can be important in order to protect print fidelity.

Printing coating material onto carrier film also facilitates the design of thin film label systems that have any desired shape including, but not limited to, oval, square, rectangular, etc. Further, the thin film labels are also designed such that the overprint and adhesive layers are present only in area where indicia is located. "Adhesive coating layer" and "adhesive layer" are used interchangeably to refer to the layer of the thin film labels, which contains the adhesive materials.

a. Label Formed from a Plurality of Labels

Designing the overprint layer 130 and adhesive layer 110 to closely mimic or outline the indicia layer 120 also provides an aesthetic that is typically not able to be accomplished through the use of currently available pressure sensitive labels. This aesthetic provides a no-label-look more typical of direct screen printing on containers without the material waste associated with die-cutting and matrix stripping pressure sensitive label material.

In these embodiments, the outline of the adhesive layer 110, the overprint layer 130, or both, may be discontinuous around portions of a complete indicia. In these embodiments the layouts, also called outlines, of the adhesive layer 110 and overprint layer 130 mimic each other, although this is not always required. A large overprint layer layout is also used to demonstrate the tactile properties achievable through this label construction.

In some embodiments, a carrier film contains a group of two or more labels that when assembled together define a complete indicia. In these embodiments, each label in the group is separated from the other labels in the group. Thus, the outline of one label (and its adhesive layer, optionally its overprint layer, if one is present) in the group is discontinuous with the outline of each of the other labels (and their corresponding adhesive layers, optional overprint layers, if present), creating a plurality of thin film labels that are supported on the carrier film to maintain spacing and registration. During application to a substrate, such as the surface of a container, this spacing and registration is typically maintained. The ability to fabricate and apply a plurality of labels in registration also provides a unique aesthetic not achievable with conventional pressure sensitive laminate labels.

Figure 4A:
FIGS. 4A-4D show four thin film label systems with the same complete indicia, but different areas for the overprint and adhesive layers. The gray areas represent the overprint and adhesive layers, while the black areas represent the indicia.

These embodiments are further described by referring to FIGS. 4A-4D. In general, FIG. 4A, contains the indicia layer in a single label that has a single continuous outline of the overprint layer 130 and adhesive layer 110, which provides a complete indicia, i.e., the desired decoration to the substrate, information about the contents of the labeled container, or both are contained in a single continuous outline of overprint and adhesive layers. As shown in FIG. 4A, the thin film label system 400a contains print indicia 120a, 120b, and 120c, and an overprint layer 130. The shape 105 of the thin film label is rectangular.

Figure 4B:
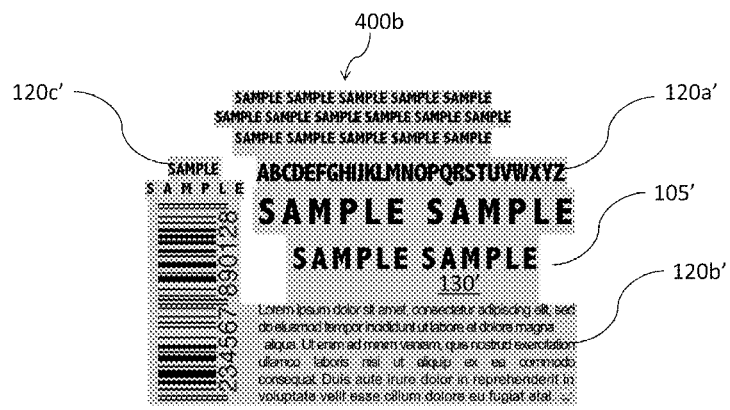

FIG. 4B shows another thin film label system, 400b that contains print indicia 120a', 120b', and 120c'. The overprint layer 130 and adhesive layer are present only where indicia are located. In FIG. 4B, the same complete indicia as shown in FIG. 4A is present, and is contained in a single label that has a single continuous outline. However, the regions containing the overprint and adhesive layers are more closely associated with regions containing the indicia compared to FIG. 4A, such that less surface area contains the overprint and adhesive layers compared to the surface area of the overprint and adhesive layers in the label of FIG. 4A.

Figure 4C:
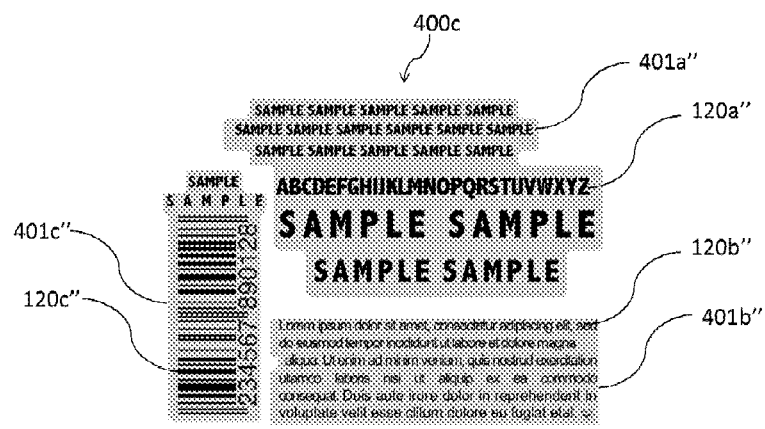
Figure 4D:

In FIGS. 4C and 4D, the indicia on the label shown in FIG. 4A are partitioned into three and seven separate labels, respectively, each containing a portion of the indicia shown in the label of FIG. 4A. For example, when the three labels shown in FIG. 4C are combined, they form group of labels that has discontinuous outlines of the individual labels in the group (and discontinuous outlines of their corresponding adhesive and overprint layers), but includes the complete indicia, as shown in FIG. 4A.

FIG. 4C shows a thin film label system 400c formed from a group of labels containing three thin film labels, 401a'', 401b'', and 401c'', each containing a portion of indicia 120a'', 120b'', and 120c'', respectively, of the complete indicia. The portions of indicia collectively form the complete indicia (as shown in FIGS. 4A and 4B).

FIG. 4D shows a thin film label system 400d formed from a plurality of seven thin film labels 401a''', 401b''', 401c''', 401d''', 401e''', 401f''', and 401 g''', each containing a portion of indicia. Portions of indicia 120a''', 120b''', and 120c''' are identified for thin film labels 401a''', 401b''', and 401c'''. The portions of indicia for all seven thin film labels collectively form the complete indicia.

These designs of thin label systems are obtained using flexographic printing and coating. As is typical with flexographic printing and coating, the flexographic inking system contains an ink/coating fountain or pan, in which the ink or coating is stored. A fountain roller rotated in the pan, picking up a film of ink/coating on its rubber-covered surface. The fountain roller acts to effectively deliver ink/coating to the surface of the adjacent anilox roller. The anilox rollers are chrome-plated or ceramic-covered rollers containing pyramid-shaped cells embedded in its surface. Other shapes that can be used include, but are not limited to hexagonal-patterns or diamond-shapes. The function of the anilox roller is to deliver a predetermined amount of ink/coating to the adjacent flexographic printing plate. The inks utilized are typical inks utilized for water-based flexographic printing. Examples include, but are not limited to, SolarAqua, SolarClear, SolarFlex, SolarScreen, and/or SunBeam (all manufactured by SunChemical).

2. Dry or Cure Coating Material to Form Overprint Layer

After the polymeric material is coated or printed onto the carrier film, it is dried or allowed to dry or cure. In some embodiments, the coating may be air-dried, IR oven dried, forced air oven dried, or cured using UV, electron beam, or other energy source to form the overprint layer. Typical periods for drying the polymeric material to form the overprint layer include open air drying, convection air drying, IR oven drying, and UV oven drying and curing. Generally, the press or coater speed and the oven length will dictate the amount of time the coating is allowed in the oven. In aqueous and solvent-based systems, preferably the coating is able to dry to below 5% (by weight) moisture while in the oven. For a typical flexographic printing press, speeds of greater than 1,200 feet per minute are obtainable with the use of forced air ovens typical to the industry.

3. Apply Inks to Exposed Surface of Overprint Layer to Form Indicia Layer

The ink/dye/pigment formulation(s) are typically applied using reverse transfer printing processes. In this process, the printer releases one or more ink/dye/pigment formulations onto the exposed surface of the overprint layer. The image that is printed on the surface is oriented as the mirror-image of the indicia that will be viewable when the label is placed on the container.

Different ink/dye/pigment formulations can be applied simultaneously or sequentially to obtain indicia with the desired appearance.

4. Apply Adhesive Layer to Exposed Surface of Indicia Layer and Exposed Surface of Overprint Layer, if any After the indicia are printed on the overprint layer, a suitable adhesive composition is coated or spot printed on top of the indicia, and any exposed portion of the overprint layer.

5. Form Roll of Labels

Once the formation of the label is complete, the label system is cut to the desired size, scored, if necessary, optionally separation portions are located between the individual labels in a set of printed labels. Finally, the set of labels is rolled to form a roll of labels.

IV. Methods of Using Thin Film Labels with Indicia

In use, a roll of a plurality of labels may be provided. High speed labeling systems can be used to remove one label at a time and adhere the adhesive layer to the desired surface of a container. Alternatively, the thin label can be transferred directly from the carrier film to the container by running the carrier film and thin label into direct contact with the surface of the container.

The carrier film can also be used to drive the label through a series of rollers to ensure uniform tension as the thin label system is contacted with the container.

As the adhesive layer adheres the label to the container, the overprint layer separates from the release layer (if present) that is attached to the carrier film or from the carrier film if a release layer is not in contact with the overprint layer, allowing the label to attach to the container.

Each successive label is removed, as described above, leaving a long roll of carrier film, which can be rewound and reused to form another roll of labels or optionally, recycled or otherwise disposed of.

When the label is placed on a container, the indicia layer is trapped between the surface of the container and the overprint layer, which protects the printed material.

In some cases the carrier film can be cut using the label application equipment or supplied in a precut form and also applied to the container.

The carrier film can optionally also carry indicia. This provides a system where the container is permanently labeled with a thin-film clear label and semi-permanently labeled with a removable carrier film.

The present invention will be further understood by reference to the following non-limiting example.

EXAMPLES

Example 1. Thin Film Label Via a Coating Technique

A thin film label was constructed with an untreated PET carrier sheet having a thickness of 3.0 mils (0.0762 mm) (SG00-300 by SKC Films). The overprint layer, containing a blend of 95% wt/wt Hybridur 580 and 5% wt/wt polyethylene wax dispersion, was coated onto the carrier film using a Mayer rod technique with an approximate dry coat weight of 4 grams/square meter. The overprint layer was dried in a forced air oven. Indicia were applied to the overprint layer using an electrostatic digital transfer printing (laser printing) technique. An adhesive layer containing Encor 123 was then applied to the web at a coverage of 5 dry grams/square meter using a Mayer rod technique. The adhesive layer was dried in a forced air oven.

The resulting label had a low percent haze, i.e. excellent clarity.

The thickness of the overprint, indicia, and adhesive layer was 0.5 mils (0.0127 mm).

Example 2. Thin Film Label Via Printing Press Techniques

In another example, the thin film label was prepared utilizing an eight station flexographic printing press (Table 1). Referring to FIG. 2B, in this example, the carrier sheet 150 was a one-side-coated PET release liner (Silphan S50 produced by Siliconature) where the side of the PET release liner being printed upon was untreated. The side of the carrier sheet opposite to that having the PET release liner was coated with a silicone coating 160 to enhance release. The press was configured to allow for one to two press stations to be utilized for the printing of the overprint coating layer 130; another one to four press stations to be utilized for the printing of the indicia 120 (Flexographic colors 1-4), and another one to two stations to be utilized for the printing of a pressure sensitive adhesive 110.

TABLE 1

Press stations from an eight station flexographic printing press, used to prepare thin film labels

| Press Station | Anilox Roller | Coating/Ink |
|---|---|---|
| 1 | 440 | Overprint Coating |
| 2 | 440 | Overprint Coating |
| 3 | 600 | Flexographic Color 1 |
| 4 | 800 | Flexographic Color 2 |
| 5 | 800 | Flexographic Color 3 |
| 6 | 800 | Flexographic Color 4 |
| 7 | 440 | Pressure Sensitive Adhesive |
| 8 | 160 | Pressure Sensitive Adhesive |

The anilox rollers were chrome-plated or ceramic-covered rollers containing pyramid-shaped cells embedded in its surface. The flexographic printing plates were set using a computer-to-plate photopolymer system. The imprinting of the flexographic printing plate dictates where coating and/or ink will be applied on the transfer carrier at the first printing stations and on top of previous prints/coats on all following printing stations. In one example, FIG. 4D, this allowed for the overprint layer 130 to only be applied in areas where indicia 120 is applied. This greatly minimized the area and volume of material needed to fabricate a label.

The overprint layer 130 contained between 80% wt/wt to 100% wt/wt Bayhydrol® UH 240, 0% wt/wt to 20% wt/wt ethanol (to control foam and coating cosmetics), and 0% wt/wt to 1% wt/wt of Blankophor P150 (Indulor America, Graham, NC)—a stilbene fluorescent whitening agent. Blankophor P150 is a black light sensitive dye that provides visual registration of layers under black light without compromising the optical clarity/haze of the dried coating). The dried layer possessed excellent clarity, elongation to break, and ultimate tensile strength. The inks utilized were typical inks utilized for water-based flexographic printing.

The adhesive used was a formulation containing between 95% wt/wt and 100% wt/wt Arkema 9466 (from Arkema) and between 0% wt/wt and 1% wt/wt Blankophor P150. Arkema 9466 is formed from an acrylic polymeric dispersion. The dried adhesive formulation possessed excellent optical clarity.

The indicia 120 utilized at the stations containing flexographic ink contained multiple lines of a text, an image, and a standard barcode.

The adhesive layer 110 and the overprint layer 130 were optically clear and as such they did not provide any ascetic value or distraction from the containers being labeled. Different layouts of the overprint and adhesive layers to maximize material use efficiency were demonstrated without impacting the aesthetic value provided by the indicia 120 (see FIGS. 4A-4D).

The press was run at web speed of 250 feet per minute with forced air ovens active after each flexographic station. An electronic vision and registration system was utilized to register the indicia and coating at each print station allowing for the coatings and indicia at each station to be placed on top of the material coated or printed at the previous station. Multiple rows or lanes of labels were fabricated across the width of the web. The carrier film was self-wound at the rewind station of the press such that the siliconized side was in contact with the pressure sensitive adhesive upon winding.

The carrier film 150 was successfully slit to the width of a single label and rewound without delamination of the thin label from the uncoated side of the PET.

The carrier film web was threaded in a custom fixture that allows the adhesive side of a single label to come into contact with a single container. The thin labels were successfully transferred from the carrier film to the container 300 (FIG. 2). Twelve containers were tested, with four in each group. The tested containers 300 included glass, PET, and PP style bottles.

Example 3. Thin Film Label from Monofunctional or Multifunctional Monomers and Oligomers Experiments were performed to determine (i) the curing abilities of UV-curable precursor materials, such as monofunctional or multifunctional monomers and oligomers, for forming overprint layers; (ii) the chemical resistance of the UV-cured overprint layers; (iii) the delamination properties of the UV-cured overprint layers from an exemplary carrier film (PET); and (iv) the force required to peel exemplary UV cured pressure sensitive adhesives from a glass substrate. The tests were performed for two separate samples containing identical components.

Single Component Monomer Systems

Figure 5:
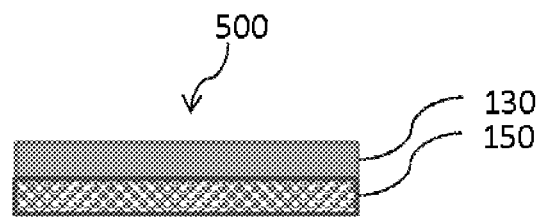
FIG. 5 shows the schematic of a system used to test the chemical resistance, delamination properties, and peel forces of overprint layers.

Referring to FIG. 5, a schematic 500 is shown containing an overprint layer 130 was formed from formulations containing single component monomers or oligomers (91% wt/wt) blended with a photoinitiator (9% wt/wt). Each component was mixed with 9% wt/wt of a photoinitiator blend and coated via a Mayer rod bar (#11 or #0) onto a carrier film 150 to form a film of the blend. The carrier film was 300 gauge PET from SKC. The film of the blend was cured with a high intensity (400 W) mercury iron iodide UV source at 100 fpm, to form an overprint layer 130 in the form of a film (see FIG. 5). The photoinitiator blend was a triple blend of photoinitiators, and contained 40% wt/wt dimethylhydroxyacetophenone (DMHA), 30% wt/wt 2,4,6-trimethylbenzoyldiphenylphosphone oxide (TPO), and 30% wt/wt hydroxylcyclohexylphenylketone (CPK).

The delamination force of the overprint layer film from the PET carrier film was measured using a Thwing-Albert FP-2260 Instrument according to ASTM method D-3330. A PET-coated overprint layer film sample area of 1" by 6" was secured to the stage and clamped to the load cell jaw clamp. The sample was pulled across the entire sample length at an angle of about 180°. The force required to delaminate the overprint layer film from the PET was recorded in units of g/mm for delamination peel force and in units of g for load mean peel force.

The 2-butanone (MEK) and isopropyl alcohol (IPA) rub tests were conducted with a Crock Meter Rub tester fitted with cheese cloth on the rubbing surface. Overprint layer film samples, saturated with either MEK or IPA, were mechanically rubbed for 50 double rubs. Dissolution or damage to the overprint layer film samples were given a score of F with the number of double rubs to achieve the failure noted. For example F-20, indicated the film sample failed the chemical rub test after 20 double rubs. Samples that did not receive any damage from the 50 double rubs received a score of P, indicating the sample passed the chemical rub test.

TABLE 2

Overprint layer single component films: poor films or no cure.

| Component | Description | Issue | MEK Rub | IPA Rub |
|---|---|---|---|---|
| Miramer M130 (monofunctional) | Isodecyl acrylate | Film did not cure after 3 passes through UV unit | Not Tested | Not Tested |
| Miramer M170 (monofunctional) | EOEOEA (2-(2-ethoxyethoxy) ethyl acrylate) | Film did not cure after 3 passes through UV unit | Not Tested | Not Tested |
| Lauryl Acrylate (monofunctional) | Dodecyl acrylate | Film did not cure after 3 passes through UV unit | Not Tested | Not Tested |
| Doublemer THFA (monofunctional) | Tetrahydrofurfuryl acrylate | Film did not cure after 3 passes through UV unit | Not Tested | Not Tested |
| SR 740A (bifunctional) | Polyethyene glycol (1000) dimethacrylate | Film did not cure after 3 passes through UV unit | Not Tested | Not Tested |
| TMPTA (trifunctional) | Trimethylolpropane triacrylate | Film severely curled the carrier film during curing forming large pieces of a brittle film | P | P |
| IBOA (monofunctional) | Isobornyl acrylate | Film cured | F-20 | F-50 |
| Genomer 1120 (monofunctional) | Trimethylcyclohexyl acrylate (TMCHA) | Film cured | F-30 | F-30 |

Single component film samples in this group were not subjected to a delamination test either due to poor film quality, as with TMPTA, or due to lack of curing, as with SR 740A. Components that did not cure were materials with mono-functionality. In the case of TMPTA, cure was achieved but the film experienced shrinkage during curing. The resulting cured film broke into large pieces which were rub tested with MEK and IPA. The TMPTA passed both of the 50 double rub tests.

Although some single component films were formed, such as from curing IBOA and TMCHA monomers, these films did not delaminate. Further, the single component films that did not delaminate, also did not pass the chemical rub tests. The results for multifunctional, single component systems are shown in Table 3.

TABLE 3

Overprint Layer Di- and Tri-functional Single Component Films: Successful PET Delamination

| Component (functionality) | Description | MEK Rub | IPA Rub | Delamination Peel Force (g/mm) | Load Mean Force (g) |
|---|---|---|---|---|---|
| NPG(PO)2DA (bifunctional) | Neopentyl glycol propoxylate(2) diacrylate | F-40 | P | 0.45 | 6.15 |
| DPGDA (bifunctional) | Dipropylene glycol diacrylate | P | P | 0.37 | 3.43 |
| TGDA (bifunctional) | Triglycerol diacrylate | P | P | 0.35 | 3.02 |
| HDDA (bifunctional) | Hexanediol diacrylate | P | P | 0.24 | 4.61 |
| SR 349 (bifunctional) | Ethoxylated (3) bisphenol A diacrylate | P | P | 0.41 | 3.39 |
| TMPEOTA (trifunctional) | Trimethoxylol propane ethoxy triacrylate | P | P | 0.14 | 2.14 |
| SR 502 (trifunctional) | Ethoxylated (20) trimethylolpropane triacrylate | F-50 | P | 0.53 | 4.01 |
| SR 9035 (trifunctional) | Ethoxylated (15) trimethylolpropane triacrylate | F-20 | F-40 | 1.09 | 1.10 |

Delamination peel forces ranged from 0.14 g/mm to 1.09 g/mm while load mean forces ranged from 1.10 g to 6.15 g.

Single Component Oligomer Systems

The results for the single component oligomer systems are shown in Table 4.

TABLE 4

Overprint Layer Single Component Films: Poor Films or No Cure

| Component (functionality) | Description | Issue | MEK Rub | IPA Rub |
|---|---|---|---|---|
| Doublemer 5400 (monofunctional) | Aliphatic urethane acrylate | Film did not cure after 3 times through UV oven | Not Tested | Not Tested |
| Ebecryl 230 (bifunctional) | Aliphatic urethane diacrylate | Film did not cure after 3 times through UV oven | Not Tested | Not Tested |
| CN 110 (bifunctional) | Epoxy acrylate oligomer | Poor draw down, poor film broke during delamination testing | F-50 | P |
| CN 104Z (bifunctional) | Bifunctional epoxy acrylate oligomer | Not fully cured at the carrier film interface-Film produced was too stiff to perform delamination testing | P | Not Tested |
| CN 964 (bifunctional) | Aliphatic polyester based urethane diacrylate | Not fully cured at the carrier film interface | P | Not Tested |
| Ebecryl 1290 (hexafunctional) | Hexafunctional aliphatic urethane acrylate | Crackled and self-delaminated during curing, large pieces which were durable enough for rub testing | P | P |
| Genomer 5275 (bifunctional) | Amine acrylate | Formed film | F-50 | F-50 |
| CN 820 (bifunctional) | Acrylic oligomer | Formed film | F-20 | F-20 |

As observed in the single component films formed from monomer, the single component films formed from oligomers, which did not delaminate, also did not pass the chemical rub tests.

The test results for the multi-functional single component oligomer systems are shown in Table 5.

TABLE 5

Overprint layer Multi-functional Single Component Films: Successful PET Delamination

| Component (functionality) | Description | MEK Rub | IPA Rub | Delamination Peel Force (g/mm) | Load Mean Force (g) |
|---|---|---|---|---|---|
| Genomer 4215 (bifunctional) | Aliphatic urethane acrylate | P | P | 1.37 | 25.00 |
| Genomer 2252 (bifunctional) | BPA epoxy diacrylate | P | P | 0.25 | 1.52 |
| Ebecryl 8402 (bifunctional) | Aliphatic urethane acrylate | F-40 | P | 2.67 | 34.10 |
| Ebecryl LEO 10551 (polydisperse functionality, between bifunctional and trifunctional) | Amine modified polyether acrylate | P | P | 0.28 | 2.33 |
| CN 113D70 (polydisperse functionality, between bifunctional and trifunctional) | Acrylic oligomer/ monomer blend | P | Not Tested | 1.31 | 25.50 |
| Genomer 4316 (trifunctional) | Aliphatic urethane acrylate | P | P | 1.73 | 19.00 |
| Genomer 3364 (trifunctional) | Polyether acrylate | P | P | 0.71 | 5.90 |
| Ebecryl 4100 (trifunctional) | Unsaturated urethane acrylate | P | P | 1.30 | 23.90 |
| Ebecryl LEO 10501 (trifunctional) | Trifunctional acrylate | P | P | 2.98 | 7.20 |
| CN 133 (trifunctional) | Aliphatic triacrylate | P | P | 1.22 | 7.04 |
| Genomer 3414 (tetrafunctional) | Polyester/ polyether acrylate | P | P | 1.54 | 22.6 |
| Ebecryl 4200 (tetrafunctional) | Unsaturated urethane acrylate | P-40 | P | 0.68 | 8.54 |

As demonstrated by the data in Table 5, urethane acrylates typically have higher load mean force values, while not increasing the delamination peel values above about 3 g/mm to 5 g/mm.

UV-Cured Pressure Sensitive Adhesives

Figure 6:
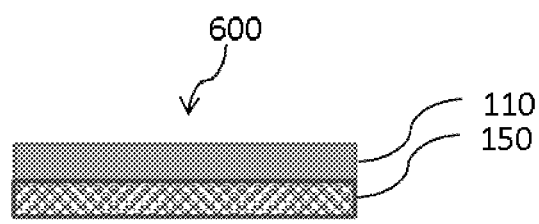
FIG. 6 shows the schematic of a system used to test the peel forces of UV-cured PSA.

All UV pressure sensitive adhesive (PSA) materials were supplied by Actega North America. Referring to FIG. 6, a schematic is shown containing an adhesive layer 110 and an untreated 500 gauge PET carrier film 150. UV-curable PSAs were applied to untreated 500 gauge PET carrier film 150 with #11 Mayer rod and cured at high intensity (400 mW) and 50 fpm to form an adhesive layer 110. Coated samples were then cut into 1" by 6" strips and applied to glass slides using a 4.5-lb weighted roller. After 2 min sitting at 23° C., quantitative peel forces were measured with a Thwing-Albert FP-2260 Instrument. The results are shown in Table 6.

TABLE 6

UV Pressure sensitive adhesive peel values

| UV Pressure Sensitive Adhesive | Peel Force (g/mm) - 2 min after application | Load Mean Force (g) - 2 min after application |
|---|---|---|
| Rad Bond 12PSFLV | 31 | 355 |
| Rad Bond 12PS12LVFB | 36 | 627 |
| Rad Bond 12PS2HTLV | 40 | 579 |

For the three UV PSA materials listed in the table above, the peel force values ranged from 31 g/mm to 40 g/mm and the load mean force values ranged from 355 g to 627 g. The 2 min peel force values for the PSA are about 37 times to 220 times greater than the delamination forces measured for the overprint layer single component films.

The values of the peel forces (g/mm) described in the experiments above represent the force required to delaminate a sample over a given distance, while the load mean force (g) is the average force measured across the entire length of the sample during the delamination test. This force can fluctuate across the length of the sample, but the reported value is the average force experienced.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A method of making a group of thin film labels comprising a plurality of thin film labels on a carrier film, wherein each thin film label comprises an overprint layer, an indicia layer, a release layer, and an adhesive layer, wherein the indicia layer is located between the overprint layer and the adhesive layer, wherein the carrier film comprises a first side and a second side, wherein the release layer is present on and abuts the first side of the carrier film, wherein the second side of the carrier film does not contain a release coating or release layer,
the method comprising:
(a) printing or coating directly onto the carrier film one or more UV-curable precursor compositions for forming the overprint layer, wherein the one or more UV-curable precursor compositions comprise a photoinitiator and a UV-curable precursor material, wherein the UV-curable precursor material is present in the UV-curable precursor composition in a concentration range of about 65% wt/wt to about 97% wt/wt;
(b) exposing the coating to ultra-violet (UV) radiation to cure the coating and form the overprint layer, wherein the overprint layer is capable of delaminating cleanly from the carrier film;
(c) printing an ink formulation one or more times on the overprint layer to form the indicia layer; and
(d) coating or printing one or more precursor formulations for forming the adhesive layer on top of the indicia layer and any exposed portion(s) of the overprint layer to form the adhesive layer.

2. The method of claim 1, wherein the photoinitiator is present in a concentration range from about 5% wt/wt to about 10% wt/wt.

3. The method of claim 2, wherein the photoinitiator is a blend of two or more photoinitiators.

4. The method of claim 2, wherein the photoinitiator is dimethylhydroxyacetophenone (DMHA), 2,4,6-trimethylbenzoyldiphenylphosphine oxide (TPO), hydroxylcyclohexylphenylketone (CPK), 2,2-dimethoxy-2-phenylacetophenone (DMPA), benzophenone, 2,2-diethyloxyactetophenone, 2,4-diethylthiozanthone, isopropylthioxanthone, 2,4,6-trimethylbenzoyldiphenylphosphine oxide dimethylhydroxyacetophenone, ethyl (2,4,6-trimethylbenzoyl) phenylphosphinate, 2-phenylbenzophenone, methyl-o-benzoyl-benzoate, or methylbenzoylformate, or a combination thereof.

5. The method of claim 1, wherein when attached to a substrate via the adhesive layer, the group of thin film labels has a force of separation from the substrate that is greater than a delamination peel force required to separate the overprint layer from the carrier film.

6. The method of claim 1, wherein the UV-curable precursor material is a compound comprising one or more acrylate functionalities, one or more alkacrylate functionalities, or a combination thereof.

7. The method of claim 6, wherein the UV-curable precursor material is neopentyl glycol propoxylate (2) diacrylate; dipropylene glycol diacrylate; triglycerol diacrylate; ethoxylated (3) bisphenol A diacrylate; trimethoxylolpropane ethoxy triacrylate;
ethoxylated (20) trimethylolpropane triacrylate; or ethoxylated (15) trimethylolpropane triacrylate; or a combination thereof.

* * * * *